(12) United States Patent
Miyamoto et al.

(10) Patent No.: US 6,395,829 B1
(45) Date of Patent: May 28, 2002

(54) AMORPHOUS POLYOLEFIN RESIN COMPOSITION

(75) Inventors: Masahiro Miyamoto; Hideki Kawai; Akira Takaki, all of Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/507,789

(22) Filed: Feb. 22, 2000

(30) Foreign Application Priority Data

Feb. 22, 1999 (JP) ............................... 11-043858

(51) Int. Cl.$^7$ ................ C08L 25/00; C08L 33/00; C08L 45/00
(52) U.S. Cl. ........................... 525/71; 525/98
(58) Field of Search ..................... 525/71, 98

(56) References Cited

U.S. PATENT DOCUMENTS

| | | | |
|---|---|---|---|
| 5,124,402 A | * | 6/1992 | Laughner et al. ............. 525/67 |
| 5,770,655 A | | 6/1998 | Sagane et al. |
| 5,863,986 A | | 1/1999 | Herrmann-Schönherr et al. |
| 6,090,888 A | * | 7/2000 | Khanarian et al. ............ 525/88 |

FOREIGN PATENT DOCUMENTS

| | | |
|---|---|---|
| EP | A 0 671 433 | 9/1995 |
| EP | A 0 761 752 | 3/1997 |
| JP | 7-292181 | 11/1995 |

* cited by examiner

*Primary Examiner*—Jeffrey Mullis
(74) *Attorney, Agent, or Firm*—Armstrong, Westerman & Hattori, LLP

(57) ABSTRACT

An amorphous polyolefin resin composition being excellent in the balance of the impact resistance with the surface smoothness and, further, the balance of the impact resistance with the transparency. In this amorphous polyolefin resin composition, a block copolymer (B-1) having at least one polymer block unit which is poor in the affinity with an amorphous polyolefin (A) but excellent in the affinity with a core-shell type elastomer (B-2) is combined with a core-shell type elastomer (B-2) which is excellent in the affinity with at least one polymer block of the block copolymer (B-1) and has a specific composition and a specific structure, and these components are composited in the amorphous polyolefin resin composition, thereby achieving well-balanced properties, i.e., an excellent impact resistance, an excellent surface glossiness and a high transparency.

6 Claims, No Drawings

AMORPHOUS POLYOLEFIN RESIN COMPOSITION

FIELD OF THE INVENTION

This invention relates to amorphous polyolefin resin compositions which are excellent in the balance of the impact resistance with the surface glossiness and, further, the balance of the impact resistance with the transparency.

BACKGROUND OF THE INVENTION

In recent years, cyclic olefin polymers (including copolymers) have attracted public attention, among amorphous polyolefins, as plastics being excellent in moldability, dimensional stability, transparency and water vapour barrier property. However, these polymers are insufficient in impact strength and, therefore, attempts have been made to improve the impact resistance. Namely, it has been required to improve the impact resistance of cyclic olefin polymers while sustaining their excellent transparency.

In general, it is known that the impact strength of a brittle thermoplastic resin can be improved by alloying it with a non-compatible rubber component. This method is also effective on cyclic olefin polymers.

JP-A-1-256548 discloses a method for improving the impact resistance of a cyclic olefin copolymer by alloying the cyclic olefin copolymer with commercially available block copolymers as rubber components (SBS, SEBS and SIS) as well as the thus obtained compositions (the term "JP-A" as used herein means an "unexamined published Japanese patent application"). However, this document states nothing about the transparency of the compositions or the surface conditions of molded articles obtained from these compositions. Even if the impact strength can be improved by using these block copolymers, this method suffers from a problem that the decrease in the transparency arising simultaneously cannot be prevented.

As another method for improving the impact-toughness of cyclic olefin copolymers, JP-A-7-278402 discloses a method of using a core-shell type elastomer and a block copolymer. In this document, it is disclosed that a method for improving the impact resistance of a brittle polymer by using a core-shell type elastomer together with a block copolymer had been known (Polymer. Vol. 28, 1703 (1987)) and that this method is also effective on cyclic olefin copolymers. It is described therein that the impact resistance of a cyclic olefin copolymer can be improved by the above method without the experimental optimization of the core-shell particles to be employed.

So long as judged from the Examples in the above document, an effect of improving the impact resistance could be found. However, the addition of the block copolymers was scarcely effective in improving the impact resistance (impact toughness). Thus, the effect is not always satisfactory and there remains room for improvement.

Based on the prior art, it might be considered to optimize the core-shell type elastomer so as to improve the impact resistance of a cyclic olefin copolymer. However, JP-A-7-278402 neither suggests any method or idea of optimizing the core-shell type elastomer to elevate the impact resistance nor describes the mechanism of improving the impact resistance with the combined use of the core-shell type elastomer and the block copolymer.

Core-shell type elastomers have been frequently used in improving the impact resistance of typical polymers to be improved in the impact resistance, for example, brittle polymers such as PVC and PMMA (PMMA is an amorphous substance similar to cyclic olefin polymers). Such a core-shell type elastomer has a core made of a rubber component (flexible component) and a graft polymer (i.e., a shell layer) formed on the surface of the core. The graft polymer is usually made of a polymer system highly compatible with the polymer which is to be improved in the impact resistance. Therefore, the core-shell type elastomer can be easily dispersed, while maintaining the primary particle size thereof, in the polymer which is to be improved in the impact resistance. Thus, it is considered that the size needed for improving the impact resistance can be easily and stably maintained and sufficient interfacial adhesion can be established, thereby ensuring the considerable improvement in the impact resistance of the polymer which is to be improved in the impact resistance. It is generally considered that the effect of improving the impact resistance of the matrix polymer cannot be sufficiently achieved unless the core-shell type elastomer is dispersed while maintaining the primary particle diameter thereof.

Therefore, it seems that the following two points are particularly important in optimizing a core-shell type elastomer.

The first point resides in that, as the graft polymer (i.e., the shell layer) of the core-shell type elastomer, a component sufficiently compatible with the polymer which is to be improved in the impact resistance should be selected so as to achieve a sufficient interfacial adhesion between the core-shell type elastomer and the polymer which is to be improved in the impact resistance (i.e., the-amorphous polyolefin in the present invention). The second point resides in that the particle size (primary particle diameter) of the core-shell type elastomer should be regulated to the optimum level that can most effectively give the impact resistance to the polymer which is to be improved in the impact resistance.

With respect to the first point as described above, the compatibility and adhesion between phases thus achieved can generally be evaluated depending on the solubility parameter (delta), as stated in JP-A-7-278402. According to JP-A-7-278402, the solubility parameter (delta) of a cyclic olefin copolymer is about 13.5 $^{1/2}cm^{3/2}$ which is significantly lower than that of a typical polymer to be improved in the impact resistance.

This fact means that a core-shell type elastomer for a typical polymer which is to be improved in the impact resistance can hardly achieve a sufficient compatibility with a cyclic olefin copolymer, thereby hardly establishing interfacial adhesion. That is to say, it can be hardly expected to achieve the effect of improving the impact resistance as observed in the case of the combination of a typical polymer having improved impact resistance with a core-shell type elastomer developed exclusively therefor.

With respect to the second point, it is generally known that the optimum primary particle diameter of a core-shell type elastomer optimum for improving the impact resistance of a brittle polymer depends on the entanglement density ($n_e$) of the polymer (S. Wu, Polymer International, 29(1992), p.229–247) and the validity of this relation is supported by experimental data (Polym. Eng. Sci., Vol. 31, 213 (1991) and J. Appl. Polym. Sci., Vol. 48, 75(1993)). Also, JP-A-7-233301 discloses this fact. From this viewpoint, it is also stated in this document that, to improve the impact resistance of a cyclic olefin copolymer, it is considered that a core-shell type elastomer should have a particle diameter of 1 to 3 $\mu$m.

Therefore, it might be considered based on the prior art that a core-shell type elastomer can be optimized, as a means for improving the method described in JP-A-7-278402, by using a graft polymer which is excellent in the compatibility (interfacial adhesion) with a cyclic olefin copolymer as the shell layer and regulating the primary particle diameter of the core-shell type elastomer to 1 to 3 μm.

As a means for improving the interfacial adhesion between the core-shell type elastomer and the cyclic olefin copolymer as discussed above, JP-A-7-300540 discloses a technique wherein a cyclic alkyl (meth)acrylate is inserted as a graft polymer (a shell layer). In the Examples given in this document, the impact resistance was improved thereby, which suggests that a compatibility would be thus achieved in a certain extent.

However, cyclic alkyl (meth)acrylates are very special monomers from an industrial viewpoint. These monomers are not only expensive but also hardly soluble in water. It is therefore considered that these cyclic alkyl (meth)acrylates would bring about difficulties in emulsion polymerization or seed polymerization usually employed in industrially producing core-shell type elastomers (the term "difficulties" as used herein means that it takes a long time to complete the polymerization, the polymerization hardly proceeds, or the stability of the polymerization system is deteriorated). Accordingly, there arises a problem that the monomers usable as the graft component are restricted in practice so that the physical properties thus achieved are also restricted. Moreover, the safety of these monomers from the viewpoint of food sanitation remains unknown. Taking these facts into consideration, the method with the use of a core-shell type elastomer having a cyclic alkyl (meth)acrylate polymer as a graft polymer (i.e., a shell layer) can be hardly regarded as a satisfactory method which may be generally and conveniently employed.

By using the conventional techniques, it is industrially difficult to produce a core-shell type elastomer having a primary particle diameter of 1 to 3 μm. In particular, specific techniques, which can be hardly employed in general, are needed to produce primary particles having such particle diameter as defined above by emulsion polymerization or seed polymerization commonly employed in the production of core-shell type elastomers.

Namely, it might be considered based on the prior art to optimize a core-shell type elastomer can be optimized for achieving an improved impact resistance, as a means for improving the method described in JP-A-7-278402, by substituting the core-shell type elastomer by one having an average particle diameter of 1 to 3 μm with the use of the technique disclosed in JP-A-7-300540. However, the thus established method can be hardly regarded as a satisfactory one from an industrial viewpoint etc., as described above.

Repeatedly speaking, JP-A-7-278402 suggests neither any method nor any idea for the improvement involving the above-described ones. Moreover, the effect achieved in this document cannot be regarded as satisfactory. On the other hand, the method described in JP-A-7-300540, wherein a cyclic alkyl (meth)acrylate is used, is not usually available or convenient, as discussed above. In addition, it is described in claims of this published application that the average particle diameter of the core-shell type elastomer is form 0.1 to 0.3 μm. Thus, there is a high possibility that this method would not effective on cyclic olefin copolymers with a need for an impact resistance improver (a rubber component) having a diameter of 1 to 3 μm for improving the impact resistance. As discussed above, there still remain various points to be improved in the prior art.

It will become apparent from the following detailed description that the method according to the present invention differs from these methods on the basis of the prior art.

SUMMARY OF THE INVENTION

In the prior art, problems arise in the balance of the practically available impact resistance with the surface smoothness and with the transparency, when the impact resistance of cyclic olefin (copolymers (i.e., amorphous polyolefins) is to be elevated while sustaining the excellent surface smoothness and transparency inherent to these polymers. An object of the present invention is to provide novel amorphous polyolefin resin compositions which make it possible to overcome these problems by an inexpensive and convenient method.

DETAILED DESCRIPTION OF THE INVENTION

In the present invention, a resin composition having an excellent impact resistance, an excellent surface glossiness and a high transparency, by which the above-described problems can be all solved, is obtained by using a combination of a block copolymer having at least one polymer block unit which is poor in the affinity with an amorphous polyolefin but excellent in the affinity with a core-shell type elastomer, together with a core-shell type elastomer which is excellent in the affinity with at least one block of the above-described block copolymer and has a specific composition and a specific structure designed based on an idea complementary contrary to the conventional method for optimizing a core-shell type elastomer for a polymer to be improved in the impact strength, and by compositing these components in an amorphous polyolefin.

Accordingly, the present invention relates to the following subjects:

an amorphous polyolefin resin composition being excellent in impact resistance and surface glossiness which is an amorphous polyolefin resin composition comprising (A) 100 parts by weight of an amorphous polyolefin and (B) from 1 to 100 parts by weight of an impact resistance improver, wherein:

said impact resistance improver (B) comprises, as the essential components, at least one block copolymer (B-1) and at least one core-shell type elastomer (B-2);

in the composition with the weight ratio of the component (A) to the component (B) (i.e., (A)/(B)) of 80/20, the impact resistance strength expressed by the Izod strength is 8 kg·cm/cm or more and said impact resistance strength is 1.4 times or more than the Izod strength at a weight ratio of the component (A) to the component (B-2) (i.e., (A)/(B-2)) of 80/20; and an injection-molded article (thickness: 3 mm) thereof has a surface gloss value (600 Gloss value) of 60 or more (Embodiment 1);

the amorphous polyolefin resin composition as in Embodiment 1 above, wherein said block copolymer (B-1) is a block copolymer having a block comprising at least one aromatic vinyl monomer, and at least one of the shell layers of said core-shell type elastomer (B-2) comprises 50% by weight or more (referring the shell layer as to 100% by weight) of an aromatic vinyl monomer and from 0 to 10% by weight of an alkyl (meth)acrylate carrying an alkyl group having 2 or less carbon atoms and/or (meth)acrylonitrile (Embodiment 2);

the amorphous polyolefin resin composition as in Embodiment 1 or 2 above, wherein:

said core-shell type elastomer (B-2) has (i) a shell layer comprising at least 70% by weight of an aromatic vinyl monomer and (ii) at least one other shell-layer;

the content of said shell layer (i) is from 1 to 20% by weight of the whole component (B-2); and said shell layer (ii) comprises at least one monomer selected from the group consisting of alkyl (meth) acrylates carrying an alkyl group having 3 or more carbon atoms, aromatic vinyl monomers, alkyl (meth) acrylates carrying an alkyl group having 2 or less carbon atoms and (meth)acrylonitrile and the total content of the alkyl (meth)acrylate carrying an alkyl group having 2 or less carbon atoms and (meth) acrylonitrile is from 0 to 10% by weight of the whole (B-2) component (Embodiment 3);

the amorphous polyolefin resin composition as in Embodiment 1 or 2 above, wherein:

said core-shell type elastomer (B-2) has (i) a shell layer comprising at least 70% by weight of an aromatic vinyl monomer and (ii) at least one other shell layer;

the content of said shell layer (i) is from 1 to 20% by weight of the whole component (B-2); and said shell layer (ii) comprises, as the essential component, an alkyl(meth)acrylate carrying an alkyl group having 3 or more carbon atoms and comprises at least one monomer selected from the group consisting of alkyl (meth)acrylates carrying an alkyl group having 3 or more carbon atoms, aromatic vinyl monomers, alkyl (meth)acrylates carrying an alkyl group having 2 or less carbon atoms and (meth)acrylonitrile and the total content of the alkyl (meth)acrylate carrying an alkyl group having 2 or less carbon atoms and (meth) acrylonitrile is from 0 to 10% by weight of the whole (B-2) component (Embodiment 4);

the amorphous polyolefin resin composition as in Embodiment 1, 2, 3 or 4 above, wherein said amorphous polyolefin (A) is a cyclic olefin copolymer (A-1) and said cyclic olefin copolymer (A-1) is an addition copolymer (A-1-1) comprising ethylene with a cyclic olefin optionally together with an α-olefin, or a hydrogenation product (A-1-2) of a ring-opening polymer of a cyclic olefin (Embodiment 5);

the amorphous polyolefin resin composition as in Embodiment 1, 2, 3, 4 or 5 above, wherein said block copolymer (B-1) is a t lease one block copolymer selected from the group consisting of aromatic vinyl-conjugated diene block copolymers having a block comprising at least one aromatic vinyl monomer, hydrogenation products thereof and aromatic vinyl-isobutylene block copolymers having a block comprising at least one aromatic vinyl monomer (Embodiment 6)

the amorphous polyolefin resin composition as claimed in Embodiment 1, 2, 3, 4, 5 or 6 above, wherein the absolute difference in refractive indexes (nD) between said block copolymer (B-1) and said amorphous polyolefin (A) is 0.010 or less, the absolute difference in refractive indexes (nD) between said core-shell type elastomer (B-2) and said amorphous polyolefin (A) is 0.010 or less, and the absolute difference in refractive indexes (nD) between the core of said core-shell type elastomer (B-2) and said amorphous polyolefin (A) is 0.010 to less (Embodiment 7);

the amorphous polyolefin resin composition as in Embodiment 1, 2, 3, 4, 5, 6 or 7 above, wherein said core-shell type elastomer (B-2) has an average primary particle diameter of from 0.02 to 0.5 $\mu$m (Embodiment 8); and the amorphous polyolefin resin composition as in Embodiment 1, 2, 3, 4, 5, 6, 7 or 8 above, which is a composition an injection-molded article (thickness: 3 mm) thereof having a total light transmittance (T%) of 80% or more, wherein said total light transmittance is 95% or more of the total light transmittance of an injection-molded article (thickness: 3 mm) made of the component (A) alone, and the haze value thereof is not more than the haze value of an injection-molded article (thickness: 3 mm) of a composition exclusively comprising a block copolymer (B-1) in the same amount as the component (B) and 100 parts by weight of the component (A) (Embodiment 9).

The amorphous polyolefin resin composition of the present invention has well-balanced impact resistance and surface glossiness which are characterized by: that it comprises 100 parts by weight (hereinafter, referred to as "parts") of an amorphous polyolefin (A) (also referred to as the component (A)) and 1 to 100 parts, preferably 1 to 50 parts, of an impact resistance improver (B) (also referred to as the component (B)) containing as the essential components at least one block copolymer (B-1) (also referred to as the component (B-1)) and at least one core-shell type elastomer (B-2) (also referred to as the component (B-2)); that, in the composition with the weight ratio of the component (A) to the component (B), i.e., (A)/(B) of 80/20 (referred to as the composition X), the impact resistance strength expressed in the Izod strength is 8 kg cm/cm or more, more preferably 10 kg ·cm/cm or more; that the impact resistance strength (Izod strength) is 1.4 times or more, particularly 1.8 times or more, still preferably 3 times or more, than the Izod strength at a weight ratio of the component (A) to the component (B-2), i.e., (A)/(B-2) of 80/20 (i.e., the composition obtained by replacing the total amount of the component (B) in the composition (X) by the component (B-2)); and that an injection-molded article (thickness: 3 mm) thereof has a surface gloss value (60° Gloss value) of 60 or more, preferably 70 or more. A composition with the weight ratio of the component (A) to the component (B), i.e., (A)/(B) of 80/20, wherein the impact resistance strength expressed in the Izod strength is less than 8 kg·cm/cm or less than 1.4 times than the impact resistance of the composition at a weight ratio of the component (A) to the component (B-2), i.e., (A)/(B-2) of 80/20, or wherein the above-described surface gloss value is less than 60, cannot be regarded as having the high impact resistance and excellent surface smoothness, which are to be achieved in the present invention.

The characteristic physical properties of the resin composition of the present invention as described above can be obtained by using a combination of a block copolymer with a specific core-shell type elastomer and dispersing these components in a composite state in an amorphous polyolefin (A).

Now, the amorphous polyolefin (A) and the impact resistance improver (B) constituting the resin composition of the present invention will be described.

The amorphous polyolefin (A) to be used in the present invention is a substantially amorphous one. The term "substantially amorphous" as used herein means having a degree of crystallization determined by X-ray diffractometry of 5% or less (0% in many cases) and showing no melting point in differential scanning calorimetry (DSC).

It is preferable that the amorphous polyolefin (A) has a bending elastic modulus of 500 MPa or more, still preferably 1,000 MPa or more. When the bending elastic modulus is less than 500 MPa, the composition of the present invention is liable to become semirigid due to the decrease in the rigidity. The above-described bending elastic modulus is a value determined in accordance with ASTM-D790.

It is preferable that the amorphous polyolefin (A) is a cyclic olefin (co)polymer (A-1) (also referred to as the polymer (A-1)).

As the polymer (A-1), it is preferable to use those having, per 100 parts of the whole polymer, 1 to 99 parts (still preferably 20 to 90 parts) of the structural unit derived from the cyclic olefin, 1 to 99 parts (still preferably 10 to 80 parts) of a structural unit derived from a non-cyclic olefin, and 0 to 20 parts (still preferably 0 to 10 parts) of a vinyl monomer having a double bond (excluding the cyclic olefin and non-cyclic olefin).

A cyclic olefin (co)polymer (A-1) adequate for the purpose of the present invention is one having a viscosity number of 25 to 200 ml/g, preferably 40 to 120 ml/g and still preferably 40 to 80 ml/g, when measured in decalin at 135° C.

Preferable embodiments of the polymer (A-1) include an addition copolymer (A-1-1) (also referred to as the polymer (A-1-1)) of ethylene with a cyclic olefin optionally together with an α-olefin (excluding ethylene), or a hydrogenation product (A-1-2) (also referred to as the polymer (A-1-2)) of a ring-opening polymer of a cyclic olefin.

The polymer (A-1-1) is an amorphous polymer having a cyclic olefin structure which has a glass transition temperature of from 50 to 250° C., preferably from 70 to 200° C. and still preferably from 80 to 180° C.

The above-described cyclic olefin is not particularly restricted. For example, those represented by the following general formulae (1) to (7) are preferably used.

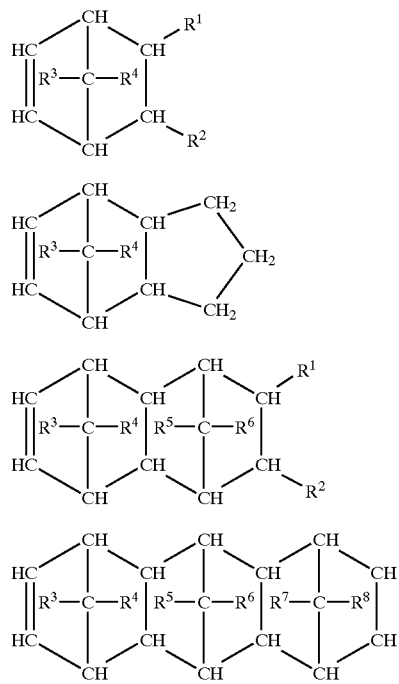

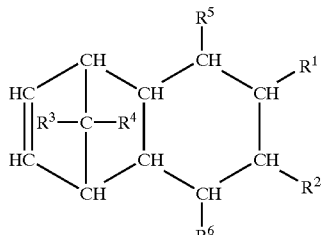

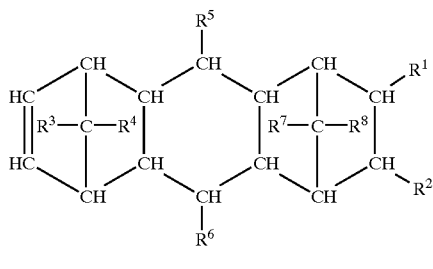

In these formulae, $R^1$ to $R^8$ are the same or different and the meanings thereof may vary from general formula to general formula, i.e., each independently represents a hydrogen atom, a hydrocarbon group having 1 to 20, preferably 1 to 5, carbon atoms (preferably an alkyl group such as methyl, ethyl, propyl or isopropyl, an aryl group having 6 to 18 carbon atoms, an alkylenearyl group having 7 to 20 carbon atoms or a cyclic or non-cyclic alkenyl group having 2 to 10 carbon atoms), or two or more of $R^1$ to $R^8$ may together form a ring; and n is an integer of from 2 to 10, preferably from 2 to 8. Either one of these compounds or a mixture of two or more thereof may be used.

Preferable examples thereof include norbornene (bicyclo [2,2,1]-2-heptene), 5-methylbicyclo[2,2,1]-2-heptene, tetracyclododecene (tetracyclo[4,4,0,1$^{2.5}$,1$^{7.10}$]-3-dodecene) and 8-methyltetracyclo[4,4,0,1$^{2.5}$,1$^{7.10}$]-3-dodecene.

The above-described non-cyclic olefin is not particularly restricted. For example, those represented by the following general formula (8) are preferably usable therefor.

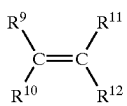

In the above formula, $R^9$ to $R^{12}$ are the same or different and each independently represents a hydrogen atom, a hydrocarbon group having 1 to 20, preferably 1 to 8, carbon atoms (preferably an alkyl group such as methyl, ethyl, propyl, isopropyl, butyl, hexyl or octyl or an aryl group having 6 to 14 carbon atoms). Either one of these compounds or a mixture of two or more thereof may be used.

Preferable examples thereof include ethylene, α-olefins such as propylene, 1-butene, 4-methyl-1-pentene, 1-hexene, 1-octene and 1-decene and isobutylene.

As an example of the vinyl monomer having a double bond as described above, 1,5-hexadiene may be cited.

Preferable examples of the cyclic olefin addition (co) polymer (A-1-1) include those having a cyclic olefin having a norbornene structure (still preferably-a cyclic olefin having a structural unit derived from norbornene or tetracyclododecene) and a non-cyclic olefin having a terminal double bond (for example, ethylene or α-olefin, preferably ethylene or propylene). Among all, copolymers comprising norbornene-ethylene, norbornene-propylene, tetracyclocdodecene-ethylene, tetracyclododecene-propylene, etc. are particularly preferable therefor. The term "structural unit derived from tetracyclododecene" as used herein means a structural unit derived from tetracyclo[4,4,0,1$^{2.5}$,1$^{7.10}$]-3-dodecene.

As the polymer (A-1-1) to be used in the present invention, those marketed products such as "Topas" manufactured by Ticona (formerly avaiable from Hoechst Aktien Gesellschaft (Germany)) and "APEL" manufactured by Mitsui Petrochemical Industries can be used.

The polymer (A-1-2) is a hydrogenation product of a cyclic olefin polymer which can be produced by, for example, subjecting a cyclic olefin to ring-opening polymerization and then hydrogenating the olefinic unsaturated bonds of the thus formed polymer. The ring-opening polymerization can be carried out by, for example, treating the cyclic olefin in a catalytic system containing a transition metal compound or a platinum group metal compound and an organic metal compound (for example, an aluminum compound) in the presence of, if desired, an additive (for example, an aliphatic or aromatic tertiary amine) at a temperature of from −30 to 120° C. under a pressure of 0 to 50 kg/cm$^2$G. The hydrogenation can be carried out in the presence of a hydrogenation catalyst commonly employed. Examples of the cyclic olefin include norbornenes such as bicyclo[2,2,1]-2-heptene, tetracyclo[4,4,0,1$^{2.5}$,1$^{7.10}$]-3-dodecene, 8-methyl-8-carboxymethyltetracyclo[4,4,0,1$^{2.5}$, 1$^{7.10}$]-3-dodecene.

As the copolymer (A-1-2) to be used in the present invention, use can be also made of marketed products such as "ZEONEX" and XEONOR" manufactured by Nippon Zeon and "ARTON" manufactured by Japan Synthetic Rubber.

The impact resistance improver (B) to be used in the present invention contains as the essential components at least one block copolymer (B-1) and at least one core-shell type elastomer (B-2). These components form a composite rubber phase in the amorphous polyolefin (A) serving as the matrix polymer. At the same time, the core-shell type elastomer forms aggregates in the amorphous polyolefin. In order to improve the impact resistance of the amorphous polyolefin (A) while sustaining the excellent surface smoothness of the injection-molded article thereof, it is highly important that the block copolymer (B-1) is combined with the core-shell type elastomer (B-2) having a specific composition and these components are in the above-described state.

By taking advantage of the fact that a plural number of the core-shell type elastomer forms aggregates in the amorphous polyolefin, the composite rubber phase size can be regulated so that it becomes larger than the primary particle diameter thereof, thereby enabling the expression of the impact resistance of the amorphous polyolefin. The present inventors have found out that the above control can be established unexpectedly stably and easily and, at the same time, use of composite rubber particles having such structure makes it possible to impart a high impact resistance to the amorphous polyolefin while sustaining an excellent surface smoothness of an injection-molded article made thereof.

As discussed above, the method for improving the impact resistance of an amorphous polyolefin by intentionally using a core-shell type elastomer having a poor affinity with the polymer to be improved in the impact resistance (this design is complementary contrary to the idea of optimization based on the prior art) and further compositing a block copolymer with the core-shell type elastomer is apparently different from the application or improvement of the existing techniques described above.

The impact resistance improver (B) contains the block copolymer (B-1) and the core-shell type elastomer (B-2) at a ratio (B-1)/(B-2) of from 1/99 to 99/1. It is undesirable that the content of the block copolymer (B-1) is less than 1% by weight or the content of the core-shell type elastomer (B-2) is less than 1% by weight, since the effect achieved by the combined use of the block copolymer (B-1) with the core-shell type elastomer (B-2) cannot be confirmed in these cases and the obtained composition sometimes shows no difference in the impact resistance or the surface smoothness or transparency in the injection-molded article thereof from those obtained by using the block copolymer (B-1) alone or the core-shell type elastomer (B-2) alone.

It is still preferable that the weight ratio of (B-1)/(B-2) ranges from 10/90 to 50/50. It is possible to obtain an amorphous polyolefin resin composition being excellent in the balance of the impact resistance with the surface smoothness and the balance of the impact resistance with the transparency which cannot be achieved by using either the block copolymer (B-1) alone or the core-shell type elastomer (B-2) alone.

It is still preferable that the weight ratio (B-1) to (B-2) ranges from 20/80 to 50/50.

Next, the block copolymer (B-1) and the core-shell type elastomer (B-2) constituting the impact resistance improver (B) will be described in detail.

At least one block copolymer (B-1) to be used in the present invention has at least two polymer block units (also referred to as blocks) which are different from each other. Examples of the block copolymer structure include diblock, triblock, multiblock, tapered block, star block and comb block structures.

The component (B-1) may have hydrocarbon groups, halogen atoms (chlorine, etc.) or functional groups (hydroxyl, carboxyl, acid anhydride, epoxy, etc.) midway or at the end of its molecular chain, so long as the effects of the present invention are not substantially deteriorated thereby.

With respect to the composition of the block copolymer, it is preferable that at least one polymer block unit has the same as or closely similar composition to at least one shell layer of the core-shell type elastomer (B-2) or has a high compatibility therewith. Thus, the affinity of the block copolymer (B-1) with the core-shell type elastomer (B-2) is elevated, thereby achieving the good balance of the impact resistance with the surface smoothness or and the good balance of the impact resistance with the transparency, i.e., the characteristics of the present invention.

Examples of the block copolymer composition usable in the present invention include aromatic vinyl, olefin, diene polyester, polyamide, vinyl chloride, polyurethane, acrylic, polyalkylsiloxane and fluoroolefin blocks.

The term a "block copolymer having an aromatic vinyl block" (also referred to as an aromatic vinyl block copolymer) means a block copolymer having at least one aromatic vinyl polymer block and at least one other polymer block differing in the components from the former one.

In such an aromatic vinyl block copolymer, the aromatic vinyl block has a poor affinity with the cyclic olefin polymer. Since the same aromatic vinyl component can be easily introduced into the core-shell type elastomer (B-2) and a sufficient affinity of the aromatic vinyl block copolymer with the core-shell type elastomer can be surely achieved. Thus, the block copolymer (B-1) having the aromatic vinyl block copolymer can be easily brought into contact with the core-shell type elastomer (B-2) and form a composite state. Moreover, the aromatic vinyl component is useful in regulating the refractive index needed for achieving a high transparency. It is therefore preferable to use the aromatic vinyl block copolymer from the viewpoint of achieving an excellent impact resistance and a high transparency too. In addition, the aromatic vinyl block copolymer is inexpensive, which is another advantage thereof.

The aromatic vinyl block comprises one or more aromatic vinyl monomers. For example, styrene, α-methylstyrene, styrene analogs having substituted aromatic rings, inden, and the like can be used.

The number-average molecular weight (Mn) of the aromatic vinyl block ranges from 1,000 to 1,000,000, preferably from 5,000 to 500,000. It is preferable that at least one of them has a glass transition temperature (Tg) of 70° C. or above, still preferably 80° C. or above. The above-described number-average molecular weight is a value obtained by GPC measurement (in terms of styrene), while the above Tg is a value obtained by differential scanning calorimetry (DSC).

Other blocks may be a homopolymer block comprising a single monomer unit and/or a random copolymer block comprises a tapered block copolymer block, etc. comprising plural types of monomer units. Also, two or more of these blocks may be contained therein in an arbitrary combination. Examples of monomers constituting these polymer blocks include ethylene, (α-olefins (propylene, etc.), isoolefins (isobutylene, etc.), cyclic olefins (norbornene, tetracyclododecene, dicyclopentadiene, etc.), conjugated dienes (butadiene, isoprene, chloroprene, etc.; optionally hydrogenated after the polymerization), alkyl or aryl (meth) acrylates (wherein the alkyl group may be a liner, branched or cyclic one and the aryl group may be substituted), optionally substituted acrylonitrile (α-ethylacrylonitrile, etc.), optionally substituted alkyl and arylacrylamides, vinyl esters, vinyl ethers (isobutyl vinyl ether, etc.) and vinyl ketones. Among these monomers, it is preferable to use conjugated dienes or isoolefins, since the objects of the present invention can be economically and conveniently achieved by using the same. It is preferable that the polymer block has a number-average molecular weight (Mn) of from 1,000 to 1,000,000 (still preferably from 5,000 to 500,000) and a glass transition temperature of less than 70° C. (still preferably 0° C. or less). These values are obtained as described above.

Such an aromatic vinyl block copolymer can be synthesized by known methods exemplified by radical polymerization, anionic polymerization, cationic polymerization and polycondensation.

It is preferable that the weight ratio of the monomer constituting the aromatic vinyl block (the monomer (X)) and the monomer constituting another block having different components (the monomer (Y)), i.e., the ratio (X)/(Y) ranges from 99/1 to 1/99, still preferably from 10/90 to 90/10 and particularly preferably from 60/40 to 10/90. It is not preferable that the content of each monomer constituting the corresponding block is less than 1% by weight. This is because in such a case, the affinity of the block copolymer (B-1) with the core-shell type elastomer (B-2) is liable to be insufficient and, as a result, it is feared that the excellent impact resistance, surface gloss or transparency (i.e., the characteristics of the present invention) cannot be established.

Examples of the aromatic vinyl block copolymer include styrene-butadiene block copolymer (SB), styrene-butadiene-styrene block copolymer (SBS), styrene-(styrene/butadiene random) block copolymer, styrene-butadiene multiblock copolymer, styrene-isoprene block copolymer (SI), styrene-isoprene-styrene block copolymer (SIS), styrene-(styrene/isoprene random) block copolymer, styrene-isoprene multiblock copolymer and hydrogenation products thereof including partly hydrogenated ones, styrene-isbutylene block copolymer (SIB), styrene-isobutylene-styrene block copolymer (SIBS) and styrene-(styrene/isobutylene random) block copolymer. Either one of these copolymers or a mixture of two or more thereof may be used.

To obtain a high impact resistance and an excellent surface gloss, it is preferable to use at least one member selected from the group consisting of hydrogenated styrene-butadiene block copolymer (SEB), hydrogenated styrene-butadiene-styrene block copolymer (SEBS), hydrogenated styrene-butadiene multiblock copolymer, styrene-isoprene block copolymer (SI) and its hydrogenation product (SEP) including partly hydrogenated ones, styrene-isoprene-styrene block copolymer (SIS) and its hydrogenation product (SEPS) including partly hydrogenated ones, styrene-isoprene multiblock copolymer and its hydrogenation product, styrene-isbutylene block copolymer (SIB), styrene-isobutylene-styrene block copolymer (SIBS) and styrene-(styrene/isobutylene random) block copolymer. To obtain a good balance of the high impact resistance with the excellent surface gloss and the high transparency, it is preferable to use at least one member selected from the group consisting of styrene-isoprene block copolymer (SI), styrene-isoprene-styrene block copolymer (SIS), styrene-isoprene multiblock copolymer, styrene-isobutylene block copolymer (SIB), styrene-isobutylene-styrene (SIBS) and styrene-(styrene/isobutylene random) block copolymer.

It is preferable that such a block copolymer has a number-average molecular weight (Mn) of from 5,000 to 2,000,000, still preferably from 10,000 to 1,000,000.

It is also possible to use marketed products as the copolymer having an aromatic vinyl block. For example, use can be made therefor of "Kraton D" and "Kraton G" manufactured by Shell Chemical, "Solprene", "Tufprene", "Asaprene" and "Tuftec" manufactured by Asahi Chemical Industry, "Septon" and "Hybrar" manufactured by Kuraray, "Zeofit" and "Quintac" manufactured by Nippon Zeon, "Europrene" manufactured by Enichem Elastmeri, "Vector" manufactured by DEXCO" and "Epofriend" manufactured by Daicel.

A styrene-isobutylene copolymer can be obtained by a method commonly employed in polymerizing vinyl compounds, e.g., living cationic polymerization. For example, JP-A-62-48704 and JP-A-64-62308 disclose that vinyl compounds such as isobutylene can be polymerized by living cationic polymerization and polyisobutylene block copolymers can be produced by using isobutylene as a vinyl compound together with other compounds. In addition, methods for producing vinyl polymers by living cationic polymerization are disclosed in U.S. Pat. Nos. 4,946,899 and 5,219,948, JP-A-3-174403, etc.

The core-shell type elastomer (B-2) of at least one core and at least one shell layer. The surface of the core is partly or totally coated with the shell layer.

The core contains, as the major component, a rubber component of a polymer having a low glass transition temperature. It may have either a uniform structure of one or more polymers or a non-uniform structure such as a so-called salami structure of two or more polymers. When the rubber component has a salami structure, it may contain two or more polymers having a low glass transition temperature differing in components from each other. Alternatively, it may contain a polymer having a high glass transition temperature as a side component enclosed therein.

It is preferable that the content of the core is from 30 to 95% by weight, still preferably 40 to 90% by weight, based on the whole core-shell type elastomer (B-2). When the content of the core is less than 30% by weight, no improvement in the impact resistance can be confirmed in some cases. On the other hand, it is undesirable that the content thereof exceeds 95% by weight, since the core-shell type elastomer (B-2) sometimes shows poor handling properties during the production thereof in such a case.

The rubber content is preferably from 30 to 100% by weight, still preferably 50 to 100% by weight, based on the whole core amount. It is undesirable that the content of the rubber component is less than 30% by weight, since the desired impact resistance of the composition of the present invention can be hardly obtained thereby.

Examples of the polymer having a low glass transition temperature which constitutes the rubber component of the core include homopolymers and copolymers derived from one or more monomers selected from conjugated diene monomers, (meth)acrylate monomers, ethyleneic unsaturated monomers having double bond and aromatic vinyl monomers. Combinations of these polymers may be also employed therefor. It is preferable that the rubber component has a glass transition temperature (Tg) of lower than 0° C., still preferably −30° C. or below.

Examples of the conjugated diene monomers constituting the rubber component include butadiene, isoprene and chloroprene. Examples of the (meth)acrylate monomers include butyl acrylate, 2-ethylhexyl acrylate and lauryl methacrylate. Examples of the ethyleneic unsaturated monomers having double bond include ethylene, propylene, 1-butene and isobutylene. Examples of the aromatic vinyl monomers include 4-butylstyrene, styrene, α-methylstyrene, halostyrene, vinylnaphthalene, and 4-phenylstyrene. In addition, (meth)acrylonitrile and substituted acrylonitrile are usable.

It is also possible to use, as the rubber phase, polymers having an organopolysiloxane structure represented by the following general formula (9):

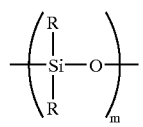

(9)

wherein R's are the same or different and each independently represents an alkyl group having 1 to 10 carbon atoms (preferably methyl, ethyl, propyl or butyl), an alkenyl group or an aryl group, which may be optionally substituted by one or more of a halogen group, a hydroxyl group, a carboxyl group, etc. so long as the object of the present invention is not deteriorated; and n is an integer of from 100 to 10,000. The alkyl and alkenyl groups may be either liner, branched or cyclic ones. Such a polymer can be obtained by, for example, ring opening-polymerization of a cyclic siloxane.

The rubber component constituting the core, which is partly or totally crosslinked, may contain from 0 to 10% by weight, preferably from 0 to 3% by weight, of a polyfunctional compound. As the polyfunctional compound, the polyfunctional unsaturated compounds cited in U.S. Pat. No. 3,787,522 can be used. Particular examples thereof include allyl methacrylate, divinylbenzene and (γ-trimethoxysilyl) propyl methacrylate.

The shell layer comprises at least one polymer layer which is made of a polymer having a high glass transition temperature and totally or partly coats the surface of the core. It is preferable that the polymer constituting the shell layer has a glass transition temperature of 0° C. or above, still preferably 20° C. or above and particularly preferably 50° C. or above, so that it can be distinguished from the rubber phase.

It is preferable that the content of the shell layer is from 5 to 70% by weight, still preferably 10 to 60% by weight, based on the whole amount of the core-shell type elastomer (B-2). When the content of the shell layer is less than 5% by weight, the core-shell type elastomer (B-2) sometimes shows poor handling properties during its production. On the other hand, it is undesirable that the content thereof exceeds 70% by weight, since no improvement in the impact resistance can be confirmed in some cases.

Examples of the polymer constituting the shell layer include homopolymers and copolymers derived from one or more monomers selected from conjugated diene monomers, (meth)acrylate monomers, ethyleneic unsaturated monomers having double bond and aromatic vinyl monomers.

Examples of the conjugated diene monomers constituting the shell layer include butadiene, isoprene and chloroprene. Examples of the (meth)acrylate monomers include methyl methacrylate, methyl acrylate, ethyl methacrylate, ethyl acrylate, propyl methacrylate, butyl methacrylate, butyl acrylate, isobutyl methacrylate, benzyl methacrylate, cyclohexyl methacrylate, norbornyl methacrylate and tetracyclododecyl methacrylate. Examples of the ethyleneic unsaturated monomers having double bond include ethylene, propylene, 1-butene, isobutylene, 4-methyl-1-pentene and 1-octene. Examples of the aromatic vinyl monomers include, styrene, α-methylstyrene, alkylstyrene, halostyrene, vinylnaphthalene, and 4-phenylstyrene.

The shell layer may be partially crosslinked. In such a case, 0 to 5% by weight, preferably 0 to 3% by weight, of a polyfunctional compound may be used. As the polyfunctional compound, polyfunctional unsaturated compounds described in U.S. Pat. No. 3,787,522 may be used. Particular examples thereof include allyl methacrylate, divinylbenzene, 1,3-butanediol dimethacrylate and (γ-trimethoxysilyl)propyl methacrylate.

Since the core and, if necessary, one or more shell layers constituting the core-shell type elastomer are crosslinked, the amorphous polyolefin (A) particles suffer from no change in the primary particle diameter and shape, even after alloying with the cyclic olefin (co)polymer (A-1). This is an important factor to achieve the object of the present invention.

The core-shell type elastomer (B-2) can be produced by a well known method. For example, emulsion polymerization or seed polymerization can be employed. When a component that cannot be emulsion-polymerized is required to be introduced into the core-shell type elastomer, microsuspension polymerization is usable. It is also possible to combine these techniques with each other. For example, a core is synthesized by subjecting a component constituting the rubber phase, which can be hardly emulsion-polymerized, to microsuspension polymerization. Then at least one shell phase is imparted thereto via seed polymerization, thereby giving a core-shell type elastomer.

A method for producing the core-shell type elastomer is described in detail in, for example, U.S. Pat. Nos. 3,833,682 and 3,787,522. Microsuspension polymerization is described in detail in, for example, U.S. Pat. Nos. 4,113,687 and 4,177,177.

In the preferable core-shell type elastomer (B-2), at least one shell layer has the same as or closely similar composition to at least one polymer block of the block copolymer or a high compatibility therewith but a poor affinity with the amorphous polyolefin (A). Thus, the affinity of the block copolymer (B-1) to the core-shell type elastomer (B-2) is elevated, thereby achieving the good balance of the impact resistance with the surface smoothness or and the good balance of the impact resistance with the transparency, i.e., the characteristics of the present invention.

From these viewpoints, the core-shell type elastomer (B-2) for combining with the aromatic vinyl block copolymer is preferably those wherein at least one of the shell layers thereof contains at least 50% by weight (still preferably form 70 to 100% by weight) of an aromatic vinyl monomer and from 0 to 10% by weight (still preferably form 0 to 8% by w eight) of an alkyl (meth)acrylate carrying an alkyl group having 2 or less carbon atoms and/or (meth) acrylonitrile, referring the shell layer as to 100% by weight. At the same time, such a core-shell type elastomer (B-2) is favorable from the viewpoint of being capable of forming aggregates in the amorphous polyolefin (A). Eve n though the core-shell type elastomer is constituted by less than 50% by weight of an aromatic vinyl monomer, aggregates can be hardly formed in some cases with the presence of some other constituting monomers. Also, it is undesirable that the content of an alkyl (meth)acrylate carrying an alkyl group having 2 or less carbon atoms and/or (meth)acrylonitrile exceeds 10% by weight, since the impact resistance sometimes cannot be sufficiently improved in such a case.

Examples of the aromatic vinyl monomer constituting the shell layer include styrene, α-methylstyrene, chlorostyrene, vinylnaphthalene, 4-phenylstyrene and indene.

By taking the impact resistance and its balance with the transparency into consideration, a still preferable example of the core-shell type elastomer (B-2) is one comprising 1 to 20% by weight (still preferably 1 to 15% by weight) of a shell layer (i) comprises 70% by weight or more (still preferably 80% by weight or more) of an aromatic vinyl monomer, and at least one other shell layer (ii), wherein the shell layer (ii) comprises at least one monomer selected from the group consisting of alkyl (meth)acrylate monomers carrying an alkyl group having 3 or more carbon atoms, aromatic vinyl monomers, alkyl (meth)acrylates carrying an alkyl group having 2 or less carbon atoms and/or (meth) acrylonitrile wherein the total content of the alkyl (meth) acrylate carrying an alkyl group having 2 or less carbon atoms and (meth)acrylonitrile is from 0 to 10% by weight (still preferably 0 to 8% by weight) of the whole (B-2) component.

As described above, the shell layer (i) is an important factor to composite the core-shell type elastomer (B-2) with the block copolymer (B-1). When the content of the shell layer (i) is less than 1% by weight, the components (B-2) and (B-1) cannot be sufficiently composited with each other in some cases. On the other hand, it is undesirable that the content of the shell layer (i) exceeds 20% by weight, since the expression of the transparency of the composition according to the present invention is sometimes disturbed thereby.

It is preferable that the shell layer (i) is located outmost among all of the shell layers of the component (B-2) or as the second layer from the outside (adjacent to the outmost layer). It is also preferable that the shell layer (i) has a glass transition temperature of 50° C. or above, still preferably 70° C. or above.

When the content of the aromatic vinyl monomer constituting the shell layer (i) is less than 70% by weight, the transparency of the composition is sometimes affected depending on the monomer species to be combined.

The shell layer (ii) plays an important role in imparting a transparency to the composition of the present invention. In addition, it seems highly possible that the shell layer (ii) also affects the size of the impact resistance improver (B) which can be dispersed in the amorphous polyolefin (A).

The content of the shell layer (ii) is 69% by weight or lower, preferably from 4 to 20% by weight, based on the total amount of the core-shell type elastomer (B-2). It is undesirable that the content of the shell layer (ii) exceeds 69% by weight, since the expression of the impact resistance cannot be confirmed in some cases due to the too small content of the rubber component in the core-shell type elastomer (B-2). When the content of the shell layer (ii) is less than 4% by weight, on the other hand, the handling properties in the production of the core-shell type elastomer are liable to be deteriorated. Thus, it is preferable that the content of the shell layer (ii) is 4% by weight or more, still preferably 10% by weight or more.

From the viewpoint of the impact resistance, it is still preferable that the content of the alkyl (meth)acrylate carrying an alkyl group having 3 or more carbon atoms is from 0 to 100% by weight, still preferably 10 to 90% by weight, of the shell layer (ii). On the other hand, it is still preferable that the content of the aromatic vinyl monomer is from 0 to less than 70% by weight, still preferably from 1 to less than 70% by weight.

Examples of the alkyl (meth)acrylate carrying an alkyl group having 3 or more carbon atoms which constitutes the shell layer (ii) include propyl (meth)acrylate, isopropyl (meth)acrylate, butyl (meth)acrylate, isobutyl (meth) acrylate, sec-butyl (meth)acrylate and 2-ethylhexyl (meth) acrylate. Among these monomers, butyl (meth)acrylate, isobutyl (meth)acrylate and 2-ethylhexyl (meth)acrylate are preferable.

Examples of the aromatic vinyl monomers include styrene, α-methylstyrene, methylstyrene, chlorostyrene, vinylnaphthalene, 4-phenylstyrene and indene. Among these monomers, styrene and α-methylstyrene are preferable.

With respect to the alkyl (meth)acrylate carrying an alkyl group having 2 or less carbon atoms and/or (meth) acrylonitrile which may be used in an amount of from 0 to 10% by weight of the whole core-shell type elastomer (B-2), examples of the alkyl (meth)acrylate include methyl (meth) acrylate and ethyl (meth)acrylate. When the content of such alkyl (meth)acrylate carrying an alkyl group having 2 or less carbon atoms and/or (meth)acrylonitrile is 10% by weight or more of the whole component (B-2), the impact resistance of the composition according to the present invention cannot be confirmed in some cases. Therefore, it is unfavorable from the viewpoint of the expression of the impact resistance to use these components in an amount of 10% by weight or more.

The shell layers (i) and (ii) may further contain a polyfunctional compound as a crosslinking component, so long as the effects of the present invention are not spoiled. For example, each shell layer may contain glycidyl (meth) acrylate, divinylbenzene, allyl methacrylate, diallyl phthalate, 1,3-butanediol dimethacrylate, etc. in a small amount, e.g., 0 to 10% by weight (more particularly 0 to 5% by weight) based on the constituting monomers thereof.

A particularly preferable example of the core-shell type elastomer (B-2), which can impart an excellent transparency and a high impact resistance to the composition of the present invention, is one comprising 1 to 20% by weight (still preferably 1 to 15% by weight) of a shell layer (i)

comprising 70% by weight or more (still preferably 80 to 100% by weight) of an aromatic vinyl monomer and at least one other shell layer (ii), wherein the shell layer (ii) comprises, as an essential component, an alkyl (meth) acrylate carrying an alkyl group having 3 or more carbon atoms optionally together with an aromatic vinyl monomer and 0 to 10% by weight (still preferably 0 to 8% by weight), based on the whole component (B-2), of at least one monomer selected from the group consisting of alkyl (meth) acrylate monomers carrying an alkyl group having 2 or less carbon atoms and (meth)acrylonitrile. Thus, the composition of the present invention which is excellent in the impact resistance and the surface smoothness and transparency of an injection-molded article made thereof can be obtained.

It is preferable that the core-shell type elastomer (B-2) has an average particle diameter of from 0.02 to 0.5 $\mu$m. This is because when the average particle diameter is less than 0.02 $\mu$m, the component (B-2) is poor in the handling properties. It is also undesirable that the average particle diameter thereof exceeds 0.5 $\mu$m, since the core-shell type elastomer (B-2) cannot be always conveniently produced in such a case. It is still preferable that the average particle diameter of the core-shell type elastomer (B-2) falls within the range of 0.05 to 0.3 $\mu$m, since the objects of the present invention can be easily achieved thereby.

The average primary particle diameter of the core-shell type elastomer (B-2) can be measured by a known method, for example, the light scattering method with the use of a light of 780 nm in wavelength in a latex state.

To express the excellent transparency of the composition of the present invention, it is essentially required that the amorphous polyolefin (A) and the impact resistance improver (B) show a small difference in the refractive indexes. However, a favorable transparency cannot be always achieved merely because of the small difference in the refractive indexes between (A) and (B).

In order to express an excellent transparency of the composition of the present invention, it is preferable that the absolute difference in refractive indexes (nD; hereinafter referred to as the nD difference) between the block copolymer (B-1) and the amorphous polyolefin (A) at 589 nm is 0.010 to less, the absolute nD difference between the core-shell type elastomer (B-2) and the amorphous polyolefin (A) is 0.010 to less, and the absolute nD difference between the core of the core-shell type elastomer (B-2) and the amorphous polyolefin (A) is 0.010 or less. A block copolymer (B-1) showing an absolute nD difference from the amorphous polyolefin (A) of 0.010 to less can be used alone. Also, a mixture of two or more block copolymers can be used therefor, so long as the absolute nD difference as described above is 0.01 or less. The transparency of the composition is liable to be lowered when the absolute nD difference between the block copolymer (B-1) and the amorphous polyolefin (A) or the absolute nD difference between the core-shell type elastomer (B-2) and the amorphous polyolefin (A) exceeds 0.010. It is undesirable that the absolute nD difference between the core of the core-shell type elastomer (B-2) and the amorphous polyolefin (A) exceeds 0.010, since the decrease in the transparency cannot be regulated in such a case.

It is still preferable that the absolute nD difference between the block copolymer (B-1) and the amorphous polyolefin (A) is 0.005 or less, the absolute nD difference between the core-shell type elastomer (B-2) and the amorphous polyolefin (A) is 0.005 or less, and the absolute nD difference between the core of the core-shell type elastomer (B-2) and the amorphous polyolefin (A) is 0.005 or less.

It is preferable that the impact resistance improver (B) is present in the amorphous polyolefin (A) substantially in the form of particles having a dispersed particle diameter of 0.3 to 3 $\mu$m (still preferably 0.5 to 2 $\mu$m). It is undesirable that the dispersed particle diameter thereof exceeds 3 $\mu$m, since there might arise some problems in the impact resistance or transparency of the composition. The term "dispersed particle diameter" as used herein is determined by taking a transmission electron microscopic (TEM) photograph by the ultrathin section method, measuring the particle diameters (converted to circular diameter) of rubber polymers observed within a range of 40×25 $\mu$m and then calculating the average dispersed particle diameter in accordance with the following formula.

$$\text{Average particle diameter} = (\Sigma niDi^4)/(\Sigma niDi^3)$$

wherein "ni" stands for the number of rubber polymer particles having a diameter (converted to circular diameter) Di ($\mu$m).

In a particularly preferred embodiment of-the present invention, the amorphous polyolefin resin composition according to the present invention is characterized in that an injection-molded article (thickness: 3 mm) thereof has a total light transmittance (T%) of 80% or more, the total light transmittance is 95% or more of the total light transmittance of an injection-molded article (thickness: 3 mm) made of the component (A) alone, and the haze value thereof is not more than the haze value of an injection-molded article (thickness: 3 mm) of a composition exclusively comprising a block copolymer (B-1) in the same amount as the component (B) and 100 parts by weight of the component (A).

As described above, the present invention makes it possible to impart an excellent impact resistance and, at the same time, to sustain the high transparency inherent to amorphous polyolefins at a high level.

The amorphous polyolefin resin composition according to the present invention may be a composition which is obtained by radical-reacting the constituting components thereof in the presence of an organic peroxide together with, if required, a radical-polymerizable polyfunctional monomer.

Examples of the organic peroxide usable in the reaction include hydroperoxides, dialkyl peroxides, diacyl peroxides, peroxyesters, peroxycarbonates, ketone peroxides, peroxyketals and azo compounds.

The hydroperoxides are exemplified by cumene hydroperoxide. The dialkyl peroxides are exemplified by di-tert-butyl hydroperoxide. The diacyl peroxides are exemplified by tert-butyl peroxybenzoate. The peroxycarbonates are exemplified by bis(4-tert-butylcyclohexyl) peroxydicarbonate. The ketone peroxides are exemplified by cyclohexanone peroxide. The peroxyketals are exemplified by 1,1-bis(tert-butylperoxy)cyclohexane. The azo compounds are exemplified by azobisisobutyronitrile (AIBN).

As the radical polymerizable polyfunctional monomer which may be employed if desired divinybenzene, allyl methacrylate, diallyl phthalate, 1,3-butanediol dimethacrylate, and the like may be used.

The organic peroxide is used in an amount of form 0.0001 to 5 parts, preferably from 0.0001 to 3 parts and still preferably from 0.0005 to 1 part, per 100 parts of the sum of the components (A) and (B).

The components (A) and (B) constituting the resin composition according to the present invention can be obtained each by radical-reacting in the presence of an organic peroxide together with, if required, a radical polymerizable functional monomer separately.

Examples of the method for obtaining the amorphous polyolefin resin composition according to the present invention include a method wherein the amorphous polyolefin (A) and the impact resistance improver (B) are dry-blended in a container and then the organic peroxide is added thereto followed by melt-kneading of the obtained mixture; and one wherein the amorphous polyolefin (A) and the impact resistance improver (B) are melt-kneaded and then the organic peroxide is added thereto followed by melt-kneading again. Alternatively, it may be obtained by adding the organic peroxide together with, if required, the radical polymerizable functional monomer to the amorphous polyolefin (A) and the impact resistance improver (B), i.e. the components constituting the resin composition of the present invention, in a molten state. The radical reaction of the resin composition according to the present invention can be also performed by adding the organic peroxide together with, if required, the radical polymerizable functional monomer dissolved in an organic solvent or an aqueous solvent to the starting materials which have been molten at a temperature at which the organic peroxide is decomposed.

The radical reaction can be completed by kneading the components constituting the resin composition in the presence of the organic peroxide at a temperature of 180 to 300° C., preferably 180 to 280° C. for 10 seconds to 10 minutes, preferably for 10 seconds to 3 minutes.

When the components (A) and (B) are thus subjected to the radical reaction, the organic peroxide is decomposed to liberate a radical and the radical reaction occurs. As a result, the amorphous polyolefin (A) and the impact resistance improver (B) partly react with each other to form a linkage. It is considered that a resin composition having a good balance of the transparency with the impact resistance can be thus obtained.

In the presence of the radical polymerizable functional monomer, the above-described crosslinking reaction can proceed more smoothly so that a resin composition having a further improved balance of the transparency with the strength can be obtained in some cases.

The resin composition is usable either alone or as a master batch to be blended with other amorphous polyolefin(s).

The amorphous polyolefin resin composition according to the present invention can be molded by well known methods by using a Banbury mixer, a roll, a single screw extruder, a twin screw extruder, a twin-screw conical extruder, a Brabender, an injection molding machine, a direct blow molding machine, a stretching blow molding machine. The amorphous polyolefin resin composition can be processed into molded articles, sheets, films, etc. by, for example, press molding, extrusion molding, injection molding, blow molding, calendar molding, inflation molding, vacuum molding, mono-axially stretching or bi-axially stretching.

The amorphous polyolefin resin composition according to the present invention may contain various additives (e.g., plasticizers, ultraviolet stabilizers, heat stabilizers, antioxidants, peroxide decomposing agents, anti static agents, external lubricants, internal lubricants, toners, etc.) each in an amount falling within the range commonly employed in the art.

The amorphous polyolefin resin composition according to the present invention can be adequately processed into, for example, bottles, cups, medical articles (blister packs, packaging films for drugs, etc.), extruded films (those for packaging, etc.), packaging films for foods, shrink films and injection molded articles.

The present invention will be described in greater detail by reference to the following Examples. However, it should be understood that the invention is not construed as being limited thereto.

Unless otherwise indicated, all parts, ratios, percentages, and the like in this specification are by weight.

The present inventors employed the following methods in measuring the Izod strength, surface smoothness, etc. by which the resin composition of the present invention is characterized, though the measuring methods are not limited thereto.

(A) Method for Preparing Composition and Test Method

Prescribed amounts of starting materials were dry-blended and then the resultant mixture was melt-kneaded by using a twin screw extruder (TEX-30HSS, manufactured by The Japan Steel Works) to give pellets. Next, these pellets were injection molded by using a prescribed mold to give a test piece. The injection pressures employed in the molding step were as follows: primary pressure/secondary pressure= 1,000/800 kg/cm$^2$.

Injection molding device: FS-75D, manufactured by Fanuc.

Molding temperature: Nozzle temperature=260–240° C. Cylinder temperature=210–255° C. Controlled so as to give the optimum surface smoothness of the molded article. Mold temperature: Either 70 or 40° C., determined so as to enable the molding in the conventional manner at a higher mold temperature.

The physical properties were measured and evaluated by the following methods.
(Izod Impact Strength)

A test piece (1.27 cm in thickness, 6 mm in width) was prepared by injection molding with the use of a mold provided with one side gate (notched tip diameter=0.25 mm, notch depth=2.54 mm).

Measuring environment: Measured after allowing to stand for 48 hours at 23° C., 50%RH.

Number of measurement: n=6–10. Hammer weight=40 kg·m.

Detailed measurement conditions other than those described above and procedures to be noted in the measurement were carried out in accordance with JIS-K7110.
(Transparency (total light transmittance and haze))

By using a plate (thickness: 3 mm) formed by injection molding, the total light transmittance (Tt%) and the haze were measured at a temperature of 23° C. in accordance with JIS-7105 by using NDH-Σ80 (manufactured by Nippon Denshoku).
(Surface Smoothness)

By using a plate (thickness: 3 mm) formed by injection molding, the gloss value at 60° was measured at a temperature of 23° C. in accordance with JIS-7105.

The surface smoothness was quantitated based on the 60° specular glossiness measured by using a glossmeter. When the sample to be measured was a transparent one, it was covered with a dark box lined with black felt and then measured.

Measuring device: NDH-Sigma 80 manufactured by Nippon Denshoku.

Test piece: A plate of 217 mm in total length, 3 mm in thickness and 19 mm in width. The smooth face was employed in the measurement.
(Refractive Index)

By using a sheet formed by press molding or injection molding, the refractive index (nD) of D-ray (589 nm) at 23° C. was measured by using an Abbe refractometer 4T (manufactured by Atago).

(B) Starting Materials Employed in Examples and Comparative Examples (Amorphous Polyolefin (A))

As the amorphous polyolefin (A), a commercially available product Topas 6013 (a registered trademark by Hochest AG, Germany) was used. When measured by DSC with the use of DSC-7 (manufactured by Perkin Elmer), this amorphous polyolefin had a glass transition temperature (Tg) of 135° C. The refractive index (nD) of this material at 589 nm was 1.535.

(Impact Resistance Improver (B))

Impact resistance improvers were prepared by dry blending the following block copolymers (B-1) with the core-shell type elastomers (B-2).

Block copolymer (B-1):

As the block copolymer, the following commercially available block copolymers were used. The refractive index of each block copolymer was measured by forming a sheet sample thereof and using an Abbe refractometer (D-ray, 589 nm) at 23° C.

SBS-1: Asaprene T430 (SBS triblock copolymer manufactured by Asahi Chemical Industry, refractive index (nD)= 1.542).

SBS-2: Kraton D-KX405CP (SBS triblock copolymer manufactured by Shell Chemical Company, refractive index (nD)=1.534).

SEP-1: Septon 1001 (SEP diblock copolymer manufactured by Kuraray, refractive index (nD)=1.512).

SIS-1: Kraton D-1111 (SIS triblock copolymer manufactured by Shell Chemical Company, refractive index (nD)= 1.535).

Table 1 summarizes the properties of these block copolymer (B-1).

TABLE 1

| Block copolymer (B-1) | Styrene unit (wt. %) | Refractive index (nD) |
|---|---|---|
| SBS-1 | 30 | 1.542 |
| SBS-2 | 24 | 1.534 |
| SEP-1 | 35 | 1.512 |
| SIS-1 | 22 | 1.535 |

(Core-shell Elastomer (B-2))

As the core-shell type elastomer (B-2), i.e., one of the components of the resin composition of the present invention, a styrene/butadiene random copolymer rubber particle latex (RB-1), which had been synthesized herein, or a commercially available butadiene rubber particle latex (RB-2) was respectively subjected to emulsion graft polymerization and used. Now, methods for synthesizing the core component (RB-1) and the core-shell type elastomers will be described.

(Synthesis of Core Component (RB-1))

The component (RB-1) is styrene/butadiene random copolymer rubber particles synthesized by the following method (styrene/butadiene=24% by weight/76% by weight).

Synthesis of RB-1:

(1) Into an autoclave filled with nitrogen, starting materials of the following composition ratio were introduced and the reaction was carried out at 60° C. for 20 hours under stirring:

| | |
|---|---|
| Butadiene | 76 parts |
| Styrene | 24 parts |
| Divinylbenzene | 1 part |
| Diisopropylbenzene hydroperoxide | 0.3 parts |
| Ethylenediaminetetraacetic acid | 0.006 parts |
| Iron(I) sulfate heptahydrate | 0.002 parts |
| Sodium formaldehyde sulfoxylate | 0.3 parts |
| Potassium oleate | 2.0 parts |
| Purified water | 220 parts. |

After the completion of the reaction, a styrene/butadiene rubber latex showing a conversion ratio of 98% and an average primary particle diameter of 0.09 μm was obtained.

(2) The rubber latex obtained in the above (1) was fed into an autoclave. After replacing the atmosphere with nitrogen, starting materials of the following composition ratio were further introduced thereinto and the reaction was carried out at 60° C. for 20 hours under stirring:

| | |
|---|---|
| Styrene/butadiene rubber latex of average particle diameter of 0.09 μm obtained in (1) (solid matter) | 30 parts |
| Butadiene | 53.2 parts |
| Styrene | 16.8 parts |
| Divinylbenzene | 0.1 part |
| Diisopropylbenzene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.2 parts |
| Potassium oleate | 1.0 parts |
| Purified water | 130 parts. |

7 and 14 hours after the initiation of the reaction, 0.5 part portions of potassium oleate were added. 10 and 16 hours thereafter, diisopropylbenzene hydroperoxide and sodium formaldehyde sulfoxylate were further added respectively in 0.1 part portions.

After the completion of the reaction, a styrene/butadiene rubber latex showing a conversion ratio of 96% and an average primary particle diameter of 0.13 μm was obtained.

(3) The rubber latex obtained in the above (2) was fed into an autoclave. After replacing the atmosphere with nitrogen, starting materials of the following composition ratio were further introduced thereinto and the reaction was carried out at 60° C. for 20 hours under stirring:

| | |
|---|---|
| Styrene/butadiene rubber latex of average particle diameter of 0.13 μm obtained in (2) (solid matter) | 30 parts |
| Butadiene | 53.2 parts |
| Styrene | 16.8 parts |
| Divinylbenzene | 0.1 part |
| Diisopropylbenzene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.2 parts |
| Potassium oleate | 1.0 parts |
| Purified water | 130 parts. |

7 and 14 hours after the initiation of the reaction, 0.2 part portions of potassium oleate were added. 10 and 16 hours thereafter, diisopropylbenzene hydroperoxide and sodium formaldehyde sulfoxylate were further added respectively in 0.1 part portions.

After the completion of the reaction, a styrene/butadiene rubber latex showing a conversion ratio of 95% and an average primary particle diameter of 0.20 μm was obtained.

Thus, a styrene/butadiene rubber latex (RB-1) containing 24% of styrene and 76% of butadiene and having an average particle diameter of 0.20 μm was obtained. In the form of a film formed by the casting method, this component (RB-1) showed a refractive index (nD) of 1.533.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

(Core Component (RB-2))

As the component (RB-2), a commercially available rubber latex Nipol LX111A2 (manufactured by Nippon Zeon) was used. Nippon Zeon's catalogue indicates that Nipol LX111A2 is made of 100% of butadiene and has a solid content of 54% and an average particle diameter of 0.30 μm.

Synthesis of core-shell type elastomer (B-2):

(1) Synthesis of CE-10

Starting materials of the following composition ratio were fed into a glass container and stirred at 70° C.:

| Purified water | 30 parts |
|---|---|
| RB-1 (solid matter) | 70 parts |
| Potassium persulfate | 0.15 parts. |

While replacing the atmosphere with nitrogen, the following substance was continuously added to the mixture over 1 hour to carry out reaction to form the first shell layer:

| Styrene | 30 parts. |
|---|---|

After the completion of the addition, 0.2 parts of potassium persulfate was added and the reaction was continued for additional 2 hours. After the completion of the reaction, the conversion ratio was 98% and the average primary particle diameter of the obtained product was 0.21 μm.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

Thus, core-shell particles (CE-10) comprising the styrene/butadiene random copolymer rubber as the core and the styrene polymer as the shell layer, were obtained in the form of a latex. To this latex, 1 part of 2,6-di-tert-butylparacresol and 1 part of dilauryl thiodipropionate were added and the resultant mixture was thoroughly stirred. Next, it was solidified by adding a 1% aqueous solution of calcium chloride followed by dehydration and drying.

(2) Synthesis of CE-20

Starting materials of the following composition ratio were fed into a glass container and stirred at 70° C.:

| Purified water | 30 parts |
|---|---|
| RB-1 (solid matter) | 70 parts |
| Cumene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.05 parts. |

While replacing the atmosphere with nitrogen, the following substances were continuously added to the mixture over 1 hour to carry out reaction to form the first shell layer:

| Styrene | 3 parts |
|---|---|
| n-Butyl acrylate | 12 parts. |

After the completion of the addition, 0.2 parts of cumene hydroperoxide was added and the reaction was continued for additional 1 hour.

After adding 0.03 parts of sodium formaldehyde sulfoxylate in the form of a 5% aqueous solution, the following substance was further added continuously to the mixture over 1 hour to carry out reaction to form the second shell layer:

| Styrene | 15 parts. |
|---|---|

After the completion of the addition, 0.2 parts of cumene hydroperoxide was added and the resultant mixture was reacted for additional 2 hours. After the completion of the reaction, the conversion ratio was 98% and the average primary particle diameter of the obtained product was 0.22 μm.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

Thus, core-shell particles (CE-20) comprising a styrene-butadiene random copolymer rubber as the core, a butyl acrylate-styrene random copolymer as the first shell layer and a styrene polymer as the second shell layer, were obtained in the form of a latex. To this latex, 1 part of 2,6-di-tert-butylparacresol and 1 part of dilauryl thiodipropionate were added and the resultant mixture was thoroughly stirred. Next, it was solidified by adding a 1% aqueous solution of calcium chloride followed by dehydration and drying. Thus the core-shell particles (CE-20) usable as the component (B-2) of the present invention were obtained.

(3) Synthesis of CE-30

A component (CE-30) was prepared by the same method as described above in the synthesis the component (CE-20) but adding the following substances continuously over 1 hour to form the first shell layer and adding the following substance continuously over 1 hour to form the second shell layer:

| <First shell layer> | |
|---|---|
| Styrene | 2 parts |
| Cyclohexyl methacrylate (CHMA) | 18 parts; |
| <Second shell layer> | |
| Styrene | 10 parts. |

After the completion of the reaction, the-conversion ratio was 98% and the average primary particle diameter of the obtained product was 0.22 μm.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

The thus obtained latex was treated in a similar way as in CE-20 and dried. Thus, core-shell particles (CE-30) comprising the styrene-butadiene random copolymer rubber as the core, the cyclohexyl methacrylate-styrene random copolymer as the first shell layer and the styrene polymer as the second shell layer were obtained.

(4) Synthesis of CE-31

A component (CE-31) was prepared by the same method as described above in the synthesis the component (CE-10) but adding the following substances continuously over 2 hour to form the first shell layer:

| <First shell layer> | |
|---|---|
| Styrene | 7.2 parts |
| Cyclohexyl methacrylate (CHMA) | 22.8 parts. |

After the completion of the reaction, the conversion ratio was 98% and the average primary particle diameter of the obtained product was 0.22 μm.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

The thus obtained latex was treated in a similar way as in CE-10 and dried. Thus, core-shell particles (CE-31) comprising the styrene-butadiene random copolymer rubber as the core and the cyclohexyl methacrylate-styrene random copolymer as the shell layer were obtained.

(5) Synthesis of CE-40

Starting materials of the following composition ratio were fed into a glass container and stirred at 70° C.:

| PB-1 (solid matter) | 70 parts |
|---|---|
| Purified water | 30 parts |
| Cumene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.05 parts. |

While replacing the atmosphere with nitrogen, the following substances were continuously added to the mixture over 1 hour to carry out reaction to form the first shell layer:

| Styrene | 4.5 parts |
|---|---|
| Butyl methacrylate (BMA) | 14.5 parts. |

After the completion of the addition, 0.1 parts of cumene hydroperoxide was added and the reaction was continued for additional 1 hour.

After adding 0.03 parts of sodium formaldehyde sulfoxylate in the form of a 5% aqueous solution, the following substance was further added continuously to the mixture over 1 hour to carry out reaction to form the second shell layer:

| Styrene | 11 parts. |
|---|---|

After the completion of the addition, 0.2 parts of cumene hydroperoxide was added and the resultant mixture was reacted for additional 2 hours. After the completion of the reaction, the conversion ratio was 98% and the average primary particle diameter of the obtained product was 0.22 μm.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

The thus obtained latex was treated in a similar way as in CE-20 and dried. Thus, core-shell particles (CE-40) comprising the styrene-butadiene random copolymer rubber as the core, the butyl methacrylate-styrene random copolymer as the first shell layer and the styrene polymer as the second shell layer were obtained.

(6) Synthesis of CE-41

Starting materials of the following composition ratio were fed into a glass container and stirred at 70° C.:

| PB-1 (solid matter) | 85 parts |
|---|---|
| Purified water | 30 parts |
| Cumene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.05 parts. |

While replacing the atmosphere with nitrogen, the following substance was continuously added to the mixture over 1 hour to carry out reaction to form the first shell layer:

| Styrene | 15 parts. |
|---|---|

After the completion of the addition, 0.2 parts of cumene hydroperoxide was added and the reaction was continued for additional 2 hours. After the completion of the reaction, the conversion ratio was 98% and the average primary particle diameter of the obtained product was 0.20 μm.

According to the measurement of the particle size distribution of this latex by using a submicron particle size distribution measuring device Nicomp Model 370HPL (manufactured by Nozaki Sangyo), particles less-than 0.1 μm or more than 0.4 μm in diameter did not exist.

The thus obtained latex was treated in a similar way as in CE-40 and dried. Thus, core-shell particles (CE-41) comprising the styrene-butadiene random copolymer rubber as the core and the styrene polymer as the shell layer were obtained (core/shell=85/15).

(7) Synthesis of CE-42

Starting materials of the following composition ratio were fed into a glass container and stirred at 70° C.:

| PB-2 (solid matter) | 70 parts |
|---|---|
| Purified water | 200 parts |
| Cumene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.05 parts. |

While replacing the atmosphere with nitrogen, the following substance was continuously added to the mixture over 1 hour to carry out reaction to form the first shell layer:

| Styrene | 30 parts. |
|---|---|

After the completion of the addition, 0.2 parts of cumene hydroperoxide was added and the reaction was continued for additional 2 hours. After the completion of the reaction, the conversion ratio was 98% and the average primary particle diameter of the obtained product was 0.21 μm.

According to the measurement of the particle size distribution of this latex was measured by using a submicron particle size distribution measuring device Nicomp Model 370HPL (manufactured by Nozaki Sangyo), particles less than 0.1 μm or more than 0.4 μm in diameter did not exit.

The thus obtained latex was treated in a similar way as in CE-40 and dried. Thus, core-shell particles (CE-42) comprising the styrene-butadiene random copolymer rubber as the core and the styrene polymer as the shell layer were obtained.

(8) Synthesis of CE-50

Starting materials of the following composition ratio were fed into a glass container and stirred at 70° C.:

| | |
|---|---|
| PB-1 (solid matter) | 80 parts |
| Purified water | 30 parts |
| Cumene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.05 parts. |

While replacing the atmosphere with nitrogen, the following substances were continuously added to the mixture over 1 hour to carry out the reaction to form the first shell layer:

| | |
|---|---|
| Styrene | 0.2 parts |
| Methyl methacrylate (MMA) | 9.8 parts. |

After the completion of the addition, 0.1 parts of cumene hydroperoxide was added and the reaction was continued for additional 1 hour.

After adding 0.03 parts of sodium formaldehyde sulfoxylate in the form of a 5% aqueous solution, the following substance was further added continuously to the mixture over 1 hour to carry out reaction to form the second shell layer:

| | |
|---|---|
| Styrene | 10 parts. |

After the completion of the addition, 0.2 parts of cumene hydroperoxide was added and the resultant mixture was reacted for additional 2 hours. After the completion of the reaction, the conversion ratio was 98% and the average primary particle diameter of the obtained product was 0.20 μm.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

The thus obtained latex was treated in a similar way as in CE-20 and dried. Thus, core-shell particles (CE-50) comprising the styrene-butadiene random copolymer rubber as the core, the methyl methacrylate-styrene random copolymer as the first shell layer and the styrene polymer as the second shell layer were obtained.

(9) Synthesis of CE-51

Materials of the following composition ratio were fed into a glass container and stirred at 70° C.:

| | |
|---|---|
| PB-1 (solid matter) | 70 parts |
| Purified water | 30 parts |
| Cumene hydroperoxide | 0.15 parts |
| Ethylenediaminetetraacetic acid | 0.006 parts |
| Iron(I) sulfate heptahydrate | 0.002 parts |
| Sodium formaldehyde sulfoxylate | 0.05 parts. |

While replacing the atmosphere with nitrogen, the following substances were continuously added to the mixture over 1 hour to carry out reaction to form the first shell layer:

| | |
|---|---|
| Styrene | 0.4 parts |
| Methyl methacrylate (MMA) | 15.6 parts. |

After the completion of the addition, 0.1 parts of cumene hydroperoxide was added and the reaction was continued for additional 1 hour.

After adding 0.03 parts of sodium formaldehyde sulfoxylate in the form of a 5% aqueous solution, the following substance was further added continuously to the mixture over 1 hour to carry out reaction to form the second shell layer:

| | |
|---|---|
| Styrene | 14 parts. |

After the completion of the addition, 0.2 parts of cumene hydroperoxide was added and the resultant mixture was reacted for additional 2 hours. After the completion of the reaction, the conversion ratio was 98% and the average primary particle diameter of the obtained product was 0.22 μm.

According to the measurement of the particle size distribution of this latex by using a submicron particle size distribution measuring device Nicomp Model 370HPL (manufactured by Nozaki Sangyo), particles less than 0.1 μm or more than 0.4 μm in diameter did not exist.

The thus obtained latex was treated in a similar way as in CE-50 and dried. Thus, core-shell particles (CE-51) comprising the styrene-butadiene random copolymer rubber as the core, the methyl methacrylate-styrene random copolymer as the first shell layer and the styrene polymer as the second shell layer were obtained.

Table 2 summarizes the core-shell type elastomers (B-2) thus synthesized.

TABLE 2

| Core-shell elastomer (B-2) | Core (a) Composition (wt. %) Butadiene | Core (a) Styrene | (a)/(B-2) × 100 (wt. %) | First shell layer (b) Composition (wt. %) Styrene | First shell layer (b) RMA* (type) | First shell layer (b) MMA | (b)/(B-2) × 100 (wt. %) | Second shell layer (c) Composition (wt. %) Styrene | (c)/(B-2) × 100 (wt. %) | (b + c)/(B-2) × 100 (wt. %) |
|---|---|---|---|---|---|---|---|---|---|---|
| CE-10 | 76 | 24 | 70 | 100 | 0 | 0 | 30 | — | — | 30 |
| CE-20 | 76 | 24 | 70 | 20 | 80(BA) | 0 | 15 | 100 | 15 | 30 |
| CE-30 | 76 | 24 | 70 | 10 | 90(CHMA) | 0 | 20 | 100 | 10 | 30 |
| CE-31 | 76 | 24 | 70 | 24 | 76(CHMA) | 0 | 30 | — | — | 30 |
| CE-40 | 76 | 24 | 70 | 24 | 76(BMA) | 0 | 19 | 100 | 11 | 30 |
| CE-41 | 76 | 24 | 85 | 100 | 0 | 0 | 15 | — | — | 15 |
| CE-42 | 100 | 0 | 70 | 100 | 0 | 0 | 30 | — | — | 30 |
| CE-50 | 76 | 24 | 80 | 2 | 0 | 98 | 10 | 100 | 10 | 20 |
| CE-51 | 76 | 24 | 70 | 2 | 0 | 98 | 16 | 100 | 14 | 30 |

*RMA means alkyl methacrylates other than MMA.

EXAMPLE 1

100 parts by weight of an amorphous polyolefin (Topas 6013) was dry-blended with 25 parts by weight of an impact resistance improver IM-1. Next, the obtained blend was melt-kneaded and then processed with a twin screw extruder to give a resin composition in the form of pellets. The impact resistance improver IM-1 comprises 40% by weight of a block copolymer SEP-1 and the remainder (60 parts by weight) of a core-shell type elastomer CE-10. Table 4 shows the results of the evaluation of the Izod strength, surface gloss value and transparency of an injection-molded article made of this resin composition. When the graft of the core-shell type elastomer (B-2) comprises the aromatic vinyl component alone, the impact resistance of the amorphous polyolefin was remarkably improved and the injection-molded article had an excellent surface smoothness.

COMPARATIVE EXAMPLE 1a 100 parts by weight of an amorphous polyolefin was dry-blended with 25 parts by weight of core-shell particles CE-10. Next, the obtained blend was melt-kneaded and then processed with a twin screw extruder to give a resin composition in the form of pellets. Table 4 shows the results of the evaluation of the Izod strength, surface gloss value and transparency of an injection-molded article made of this resin composition. Sufficient impact resistance could not be achieved because of the absence of the block copolymer, i.e., an essential component in the present invention.

COMPARATIVE EXAMPLE 1b 100 parts by weight of COC was dry-blended with 25 parts by weight of a block copolymer SEP-1. Next, the obtained blend was melt-kneaded and then processed with a twin screw extruder to give a resin composition in the form of pellets. Table 4 shows the results of the evaluation of the Izod strength, surface gloss value and transparency of an injection-molded article made of this resin composition. Sufficient impact resistance could not be achieved because of the absence of the core-shell type elastomer (B-2), i.e., an essential component in the present invention.

EXAMPLE 2

100 parts by weight of an amorphous polyolefin was dry-blended with 25 parts by weight of an impact resistance improver IM-2. Next, the obtained blend was melt-kneaded and then processed with a twin screw extruder to give a resin composition in the form of pellets. The impact resistance improver IM-2 comprises 25% by weight of a block copolymer SIS-1 and the remainder (75 parts by weight) of a core-shell type elastomer CE-20. Table 4 shows the results of the evaluation of the Izod strength, surface gloss value and transparency of an injection-molded article made of this resin composition. By using the impact resistance improver satisfying the requirements of the present invention, the impact resistance of the amorphous polyolefin was remarkably improved and the injection-molded article had an excellent surface smoothness.

COMPARATIVE EXAMPLE 2a 100 parts by weight of an amorphous polyolefin was dry-blended with 25 parts by weight of core-shell particles CE-20. Next, the obtained blend was melt-kneaded and then processed with a twin screw extruder to give a resin composition in the form of pellets. Table 4 shows the results of the evaluation of the Izod strength, surface gloss value and transparency of an injection-molded article made of this resin composition. Sufficient impact resistance could not be achieved because of the absence of the block copolymer, i.e., an essential component in the present invention.

COMPARATIVE EXAMPLE 2b 100 parts by weight of an amorphous polyolefin was dry-blended with 25 parts by weight of a block copolymer SIS-1. Next, the obtained blend was melt-kneaded and then processed with a twin screw extruder to give a resin composition in the form of pellets. Table 4 shows the results of the evaluation of the Izod strength, surface gloss value and transparency of an injection-molded article made of this resin composition. Sufficient impact resistance could not be achieved, since the resin composition contained no core-shell type elastomer, i.e., an essential component in the present invention but the block copolymer alone.

COMPARATIVE EXAMPLE 2c 100 parts by weight of an amorphous polyolefin was dry-blended with 25 parts by weight of a block copolymer SBS-1. Next, the obtained blend was melt-kneaded and then processed with a twin screw extruder to give a resin composition in the form of pellets. Table 4 shows the results of the evaluation of the Izod strength, surface gloss value and transparency of an injection-molded article made of this resin composition. The block copolymer SBS-1 could give a sufficient impact resistance by itself, different from Comparative Example 2b. However, it was impossible to achieve any favorable surface smoothness simultaneously. Thus, it was confirmed that the present invention is characterized by enabling the achievement of both of high impact resistance and excellent surface smoothness.

EXAMPLE 3

100 parts by weight of an amorphous polyolefin was dry-blended with 25 parts by weight of an impact resistance improver IM-3. Next, the obtained blend was melt-kneaded and then processed with a twin screw extruder to give a resin composition in the form of pellets. The impact resistance improver IM-3 comprises 25% by weight of a block copolymer SIS-1 and the remainder (75 parts by weight) of a core-shell type elastomer CE-30 having the first shell layer made of a cyclohexyl methacrylate-styrene copolymer and the second shell layer made of a styrene polymer. Table 4 shows the results of the evaluation of the Izod strength, surface gloss value and transparency of an injection-molded article made of this resin composition. By using the impact resistance improver satisfying the requirements of the present invention, the impact resistance of the amorphous polyolefin was remarkably improved and the injection-molded article had an excellent surface smoothness.

COMPARATIVE EXAMPLE 3

100 parts by weight of an amorphous polyolefin was dry-blended with 25 parts by weight of an impact resistance improver IMH-3. Next, the obtained blend was melt-kneaded and then processed with a twin screw extruder to give a resin composition in the form of pellets. The impact resistance improver IMH-3 comprises 25% by weight of a block copolymer SIS-1 and the remainder (75 parts by weight) of a core-shell type elastomer CE-31 having a shell layer made of a cyclohexyl methacrylate-styrene copolymer alone. Namely, this core-shell type elastomer had no shell layer containing 50% by weight or more of an aromatic vinyl monomer. Table 4 shows the results of the evaluation of the Izod strength, surface gloss value and transparency of an injection-molded article made of this resin composition. The impact resistance was improved only slightly. According to the examination of this system by observing under a TEM, the core-shell type elastomer CE-31 and the block copolymer SIS-1 were separately dispersed, which is considered to be due to the insufficient affinity of the core-shell type elastomer with the block copolymer.

Therefore, it can be understood that when the block copolymer (B-1) and the core-shell type elastomer (B-2) constituting the impact resistance improver (B) failed to satisfy the requirements of the present invention and did not sufficiently composite together in the amorphous polyolefin, sufficient impact resistance could not be achieved.

EXAMPLE 4

100 parts by weight of an amorphous polyolefin was dry-blended with 25 parts by weight of an impact resistance improver IM-4. Next, the obtained blend was melt-kneaded and then processed with a twin screw extruder to give a resin composition in the form of pellets. The impact resistance improver IM-4 comprises 25% by weight of a block copolymer SIS-1 and the remainder (75 parts by weight) of a core-shell type elastomer CE-40. Table 4 shows the results of the evaluation of the Izod strength, surface gloss value and transparency of an injection-molded article made of this resin composition.

When the block copolymer (B-1) and the core-shell type elastomer (B-2) constituting the impact resistance improver (B) and the core component (RB-1) of the core-shell type elastomer (B-2) had each a difference in the refractive index from the amorphous polyolefin (A) of not more than 0.010 and the whole impact resistance improver (B) had a difference in the refractive index from the amorphous polyolefin (A) of not more than 0.010, the impact resistance of the amorphous polyolefin could be sufficiently improved and, at the same time, a good surface smoothness and a high transparency of the injection-molded article thereof could be both established.

EXAMPLE 4a 100 parts by weight of an amorphous polyolefin was dry-blended with 25 parts by weight of an impact resistance improver IMH-4a. Next, the obtained blend was melt-kneaded and then processed with a twin screw extruder to give a resin composition in the form of pellets. The impact resistance improver IMH-4a comprises 40% by weight of a block copolymer SEP-1 and the remainder (60 parts by weight) of a core-shell type elastomer CE-10. Table 4 shows the results of the evaluation of the Izod strength, surface gloss value and transparency of an injection-molded article made of this resin composition.

When the whole impact resistance improver comprises a SEP-1 with CE-10 had a difference in the refractive index form the amorphous polyolefin resin composition of not more than 0.010 but the copolymer (B-1) and the core-shell type elastomer (B-2) constituting the impact resistance improver (B) had each a difference in the refractive index from the amorphous polyolefin (A) exceeding 0.010, the impact resistance of the amorphous polyolefin could be sufficiently improved and a good surface smoothness of the injection-molded article could be obtained but only an insufficient total light transmission was observed, indicating that good transparency was not obtained.

EXAMPLE 4b 100 parts by weight of an amorphous polyolefin was dry-blended with 25 parts by weight of an impact resistance improver IMH-4b. Next, the obtained blend was melt-kneaded and then processed with a twin screw extruder to give a resin composition in the form of pellets. The impact resistance improver IMH-4b comprises 30% by weight of a block copolymer SEP-1 and the remainder (70 parts by weight) of a core-shell type elastomer CE-41. Table 4 shows the results of the evaluation of the Izod strength, surface gloss value and transparency of an injection-molded article made of this resin composition.

When the whole impact resistance improver (B) had a difference in the refractive index from the amorphous polyolefin (A) of not more than 0.010 and the core-shell type elastomer (B-2) constituting the impact resistance improver (B) and the core component of the component (B-2) had each a difference in the refractive index from the amorphous polyolefin (A) of not more than 0.010 but the block copolymer (B-1) had a difference in the refractive index from the amorphous polyolefin (A) exceeding 0.010, the impact resistance of the amorphous polyolefin could be sufficiently improved and a good surface smoothness of the injection-molded article could be obtained but only an insufficient total light transmission was observed, indicating that good transparency was not obtained.

EXAMPLE 4c 100 parts by weight of an amorphous polyolefin was dry-blended with 25 parts by weight of an impact resistance improver IMH-4c. Next, the obtained blend was melt-kneaded and then processed with a twin screw extruder to give a resin composition in the form of pellets. The impact resistance improver IMH-4c comprises 15% by weight of a block copolymer SBS-2 and the remainder (85 parts by weight) of a core-shell type elastomer CE-42. Table 4 shows the results of the evaluation of the Izod strength, surface gloss value and transparency of an injection-molded article made of this resin composition.

When the whole impact resistance improver (B) had a difference in the refractive index from the amorphous polyolefin (A) of not more than 0.010 and the block copolymer (B-1) and the core-shell type elastomer (B-2) constituting the impact resistance improver (B) had each a difference in the refractive index from the amorphous polyolefin (A) of not more than 0.010 but the core component of the core-shell type elastomer (B-2) had a difference in the refractive index from the amorphous polyolefin (A) exceeding 0.010, the impact resistance of the amorphous polyolefin could be sufficiently improved and a good surface smoothness of the injection-molded article could be obtained but only an insufficient total light transmission was observed, indicating that good transparency was not obtained.

EXAMPLE 5

100 parts by weight of an amorphous polyolefin was dry-blended with 25 parts by weight of an impact resistance improver IM-5. Next, the obtained blend was melt-kneaded and then processed with a twin screw extruder to give a resin composition in the form of pellets. The impact resistance improver IM-5 comprises 25% by weight of a block copolymer SIS-1 and the remainder (75 parts by weight) of a core-shell type elastomer CE-50. Table 4 shows the results of the evaluation of the Izod strength, surface gloss value and transparency of an injection-molded article made of this resin composition.

When the core-shell type elastomer (B-2) contained less than 10% by weight, based on the total amount of (B-2), of methyl methacrylate as a graft component of the core shell particles (B-2), the impact resistance of the amorphous polyolefin could be remarkably improved and, at the same time, a good surface smoothness and a high transparency of the injection-molded article thereof could be both established.

COMPARATIVE EXAMPLE 5

100 parts by weight of an amorphous polyolefin was dry-blended with 25 parts by weight of an impact resistance improver IMH-5. Next, the obtained blend was melt-kneaded and then processed with a twin screw extruder to give a resin composition in the form of pellets. The impact resistance improver IMH-5 comprises 25% by weight of a triblock copolymer SIS-1 and the remainder (75 parts by weight) of a core-shell type elastomer CE-51. Table 4 shows the results of the evaluation of the Izod strength, surface gloss value and transparency of an injection-molded article made of this resin composition.

When the core-shell type elastomer (B-2) contained more than 10% by weight of methyl methacrylate as a graft component of the core-shell type elastomer (B-2), the impact resistance of the amorphous polyolefin could not be sufficiently improved.

COMPARATIVE EXAMPLE 6

The physical properties of an injection-molded article made of the amorphous polyolefin employed in the above Examples 1 to 5 and Comparative Examples 1 to 5, i.e., Topas 6013 alone. Table 4 summarizes-the results. A high transparency and a good surface smoothness but a low Izod strength and a poor impact resistance were thus obtained.

Table 3 summarizes the constitution of each impact resistance improver (B).

TABLE 3

| Impact resistance improver (B) | | Block copolymer (B-1) | | Core-shell type elastomer (B-2) | | |
|---|---|---|---|---|---|---|
| Type | Refractive index (nD) | Type (wt. %) | Refractive index (nD) | Type (wt. %) | Refractive index (nD) | |
| | | | | | Core | Whole (B-2) |
| IM-1 | 1.534 | SEP-1 (40%) | 1.512 | CE-10 (60%) | 1.533 | 1.550 |
| IM-2 | 1.535 | SIS-1 (25%) | 1.535 | CE-20 (75%) | 1.533 | 1.535 |
| IM-3 | 1.531 | SIS-1 (25%) | 1.535 | CE-30 (75%) | 1.533 | 1.530 |
| IMH-3 | 1.531 | SIS-1 (25%) | 1.535 | CE-31 (75%) | 1.533 | 1.530 |
| IM-4 | 1.535 | SIS-1 (25%) | 1.535 | CE-40 (75%) | 1.533 | 1.535 |
| IMH-4a | 1.530 | SEP-1 (40%) | 1.512 | CE-10 (60%) | 1.533 | 1.550 |
| IMH-4b | 1.533 | SEP-1 (30%) | 1.512 | CE-41 (70%) | 1.533 | 1.542 |
| IMH-4c | 1.535 | SBS-2 (15%) | 1.534 | CE-42 (85%) | 1.511 | 1.535 |
| IM-5 | 1.535 | SIS-1 (25%) | 1.535 | CE-50 (75%) | 1.533 | 1.535 |
| IMH-5 | 1.535 | SIS-1 (25%) | 1.535 | CE-51 (75%) | 1.533 | 1.535 |

TABLE 4

|  | Amorphous polyolefin (A) (part) | Impact resistance improver (B) (part) | Dispersion state of (B-1) and (B-2) | Izod strength kg. cm/cm | Gloss | Transparency T (%) | Hz |
|---|---|---|---|---|---|---|---|
| Ex. 1 | Topas 6013(100) | IM-1(25) | Contacting & dispersed together | 22 | 75 | opaque | — |
| C. Ex. 1a | Topas 6013(100) | CE-10(25) | — | 6 | 45 | opaque | — |
| C. Ex. 1b | Topas 6013(100) | SEP-1(25) | — | 5 | 96 | opaque | — |
| Ex. 2 | Topas 6013(100) | IM-2(25) | Contacting & dispersed together | 17 | 92 | 88 | 13 |
| C. Ex. 2a | Topas 6013(100) | CE-20(25) | — | 4 | 94 | 88 | 12 |
| C. Ex. 2b | Topas 6013(100) | SIS-1(25) | — | 5 | 100 | 86 | 16 |
| C. Ex. 2c | Topas 6013(100) | SBS-1(25) | — | 22 | 24 | 85 | 59 |
| Ex. 3 | Topas 6013(100) | IM-3 | Contacting & dispersed together | 14 | 85 | 88 | 16 |
| C. Ex. 3 | Topas 6013(100) | IMH-3 | Dispersed separately | 4 | 86 | 88 | 11 |
| Ex. 4 | Topas 6013(100) | IM-4(25) | Contacting & dispersed together | 24 | 92 | 88 | 13 |
| Ex. 4a | Topas 6013(100) | IMH-4a(25) | Contacting & dispersed together | 22 | 70 | 52 | 69 |
| Ex. 4b | Topas 6013(100) | IMH-4b(25) | Contacting & dispersed together | 26 | 70 | 66 | 71 |
| Ex. 4c | Topas 6013(100) | IMH-4c(25) | Contacting & dispersed together | 25 | 85 | 71 | 45 |
| Ex. 5 | Topas 6013(100) | IM-5(25) | Contacting & dispersed together | 25 | 80 | 87 | 19 |
| C. Ex. 5 | Topas 6013(100) | IMH-5(25) | Contacting & dispersed together | 7 | 70 | 87 | 27 |
| C. Ex. 6 | Topas 6013(100) | — | — | 3 | 150 | 90 | 3 |

Ex.: Example
C. Ex.: Comparative Example

The present invention can provide amorphous polyolefin resin compositions which are excellent in the balance of the impact resistance with the surface smoothness and, further, the balance of the impact resistance with the transparency and injection-molded articles made thereof.

While the invention has been described in detail and with reference to specific embodiments thereof, it will be apparent to one skilled in the art that various changes and modifications can be made therein without departing from the spirit and scope thereof.

This application is based on Japanese patent application No. Hei.-11-43858, filed on Feb. 22, 1999, herein incorporated by reference.

What is claimed is:

1. An amorphous polyolefin resin composition being excellent in impact resistance and surface glossiness which is an amorphous polyolefin resin composition comprising (A) 100 parts by weight of an amorphous polyolefin and (B) from 1 to 100 parts by weight of an impact resistance improver, wherein:

said impact resistance improver (B) comprises, as the essential components, at least one block copolymer (B-1) and at least one core-shell elastomer (B-2);

said core-shell elastomer (B-2) has (i) a shell layer comprising at least 70% by weight of an aromatic vinyl monomer and (ii) at least one other shell layer;

the content of said shell layer (i) is from 1 to 20% by weight of the whole component (B-2);

said shell layer (ii) comprises at least one monomer selected from the group consisting of alkyl (meth)acrylates carrying an alkyl group having 3 or more carbon atoms, aromatic vinyl monomers, alkyl (meth)acrylates carrying an alkyl group having 2 or less carbon atoms and (meth)acrylonitrile and the total content of the alkyl (meth)acrylate carrying an alkyl group having 2 or less carbon atoms and (meth)acrylonitrile is from 0 to 10% by weight of the whole (B-2) component;

in an arbitrary composition comprising component (A) and components (B-1) and (B-2) with a same ratio of component (B-1) to component (B-2) (i.e., (B-1)/(B-2)) as said amorphous polyolefin resin composition and with a weight ratio of the component (A) to the component (B) (i.e., (A)/(B)) of 80/20, the impact resistance strength expressed by the Izod strength is 8 kg·cm/cm or more and said impact resistance strength is 1.4 times or more than the Izod strength of a composition comprising (A) and (B-2) without (B-1) at a weight ratio of the component (A) to the component (B-2) (i.e., (A)/(B-2)) of 80/20; and an injection-molded article (thickness: 3 mm) of said amorphous polyolefin resin composition has a surface gloss value (60° Gloss value) of 60 or more, wherein said amorphous polyolefin (A) is a cyclic olefin copolymer (A-1) and said cyclic olefin copolymer (A-1) is an addition copolymer (A-1-1) comprising ethylene with a cyclic olefin optionally together with an α-olefin, or a hydrogenation product (A-1-2) of a ring-opening polymer of a cyclic olefin.

2. The amorphous polyolefin resin composition as claimed in claim 1, wherein:

said shell layer (ii) comprises, as the essential component, an alkyl (meth)acrylate carrying an alkyl group having 3 or more carbon atoms.

3. The amorphous polyolefin resin composition as claimed in claim 1 or 2 which is a composition such that an injection-molded article (thickness: 3 mm) thereof has a total light transmittance (T%) of 80% or more, wherein said total light transmittance is 95% or more of the total light transmittance of an injection-molded article (thickness: 3 mm) made of the component (A) alone, and the haze value thereof is not more than the haze value of an injection-molded article (thickness: 3 mm) of a composition exclusively comprising a block copolymer (B-1) in the same amount as the component (B) and 100 parts by weight of the component (A).

4. The amorphous polyolefin resin composition as claimed in claim 1 or 2, wherein said block copolymer (B-1) is at least one block copolymer selected from the group consisting of aromatic vinyl-conjugated diene block copolymers having a block comprising at least one aromatic vinyl monomer, hydrogenation products thereof and aromatic vinyl-isobutylene block copolymers having a block comprising at least one aromatic vinyl monomer.

5. The amorphous polyolefin resin composition as claimed in claim 1 or 2, wherein the absolute difference in refractive indexes (nD) between said block copolymer (B-1) and said amorphous polyolefin (A) is 0.010 to less, the absolute difference in refractive indexes (nD) between said core-shell elastomer (B-2) and said amorphous polyolefin (A) is 0.010 to less, and the absolute difference in refractive indexes (nD) between the core of said core-shell elastomer (B-2) and said amorphous polyolefin (A) is 0.010 to less.

6. The amorphous polyolefin resin composition as claimed in claim 1 or 2, wherein said core-shell elastomer (B-2) has an average primary particle diameter of from 0.02 to 0.5 mm.

* * * * *